United States Patent
Muthiah

(10) Patent No.: US 11,523,145 B2
(45) Date of Patent: Dec. 6, 2022

(54) DATA STORAGE DEVICE AND METHOD FOR REAL-TIME DATA LOCKING IN SURVEILLANCE STORAGE

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/179,967

(22) Filed: Feb. 19, 2021

(65) Prior Publication Data
US 2022/0217423 A1 Jul. 7, 2022

Related U.S. Application Data

(60) Provisional application No. 63/133,487, filed on Jan. 4, 2021.

(51) Int. Cl.
| | |
|---|---|
| *H04N 21/81* | (2011.01) |
| *H04N 21/6587* | (2011.01) |
| *H04N 21/431* | (2011.01) |
| *H04N 7/173* | (2011.01) |
| *H04N 21/218* | (2011.01) |
| *H04N 5/77* | (2006.01) |
| *H04N 5/76* | (2006.01) |
| *H04N 21/845* | (2011.01) |

(52) U.S. Cl.
CPC ....... *H04N 21/2181* (2013.01); *H04N 5/7605* (2013.01); *H04N 5/77* (2013.01); *H04N 21/8455* (2013.01)

(58) Field of Classification Search
USPC .......................................................... 709/219
See application file for complete search history.

(56) References Cited

U.S. PATENT DOCUMENTS

| | | | |
|---|---|---|---|
| 7,847,820 B2 | 12/2010 | Vallone et al. | |
| 8,488,969 B1* | 7/2013 | Masarik | H04B 1/385 398/141 |
| 8,964,054 B2* | 2/2015 | Jung | H04N 5/772 348/333.01 |
| 2006/0190419 A1 | 8/2006 | Bunn et al. | |
| 2018/0152764 A1* | 5/2018 | Taylor | G06Q 30/0623 |

(Continued)

FOREIGN PATENT DOCUMENTS

| | | |
|---|---|---|
| EP | 1900215 A2 | 3/2008 |
| JP | 2010-161740 A | 7/2010 |

OTHER PUBLICATIONS

U.S. Appl. No. 16/781,717, filed Feb. 4, 2020, entitled "Storage System and Method for Optimized Surveillance Search."

(Continued)

*Primary Examiner* — Jude Jean Gilles
(74) *Attorney, Agent, or Firm* — Crowell & Moring LLP

(57) ABSTRACT

A data storage device and method for real-time data locking in surveillance storage are provided. In one embodiment, a data storage device is provided comprising a memory and a controller. The controller is configured to receive an image of an object of interest from a host; receive a video stream from the host; and as the video stream is being received from the host, determine whether the object of interest is present in the video stream. Other embodiments are provided.

20 Claims, 6 Drawing Sheets

(56) References Cited

U.S. PATENT DOCUMENTS

| | | | |
|---|---|---|---|
| 2019/0020910 A1* | 1/2019 | Panje | H04N 21/234309 |
| 2019/0045140 A1* | 2/2019 | Talmor Marcovici | H04N 21/44209 |
| 2019/0104276 A1* | 4/2019 | Vu | H04N 21/426 |
| 2019/0208114 A1* | 7/2019 | Ginat | H04N 21/2662 |
| 2019/0215541 A1* | 7/2019 | Di Pietro | H04L 63/205 |
| 2019/0253747 A1* | 8/2019 | Ramaswamy | H04N 21/431 |
| 2020/0009727 A1* | 1/2020 | Hosek | H01L 21/67259 |
| 2021/0240764 A1* | 8/2021 | Muthiah | G06F 16/7837 |

OTHER PUBLICATIONS

International Search Report dated Sep. 13, 2021 for International Application No. PCT/US2021/034038.
Written Opinion dated Sep. 13, 2021 for International Application No. PCT/US2021/034038.
Search Strategy dated Sep. 13, 2021 for International Application No. PCT/US2021/034038.

* cited by examiner

DATA STORAGE DEVICE AND METHOD FOR REAL-TIME DATA LOCKING IN SURVEILLANCE STORAGE

CROSS-REFERENCE TO RELATED APPLICATION

This application claims the benefit of U.S. provisional patent application No. 63/133,487, filed Jan. 4, 2021, which is hereby incorporated by reference.

BACKGROUND

A data storage device can be used to store a video stream sent to it by a host. In a surveillance environment, the video stream can be stored in the data storage device's memory in the Moving Picture Experts Group Transport Stream (MPEG-TS) format. Searching for an object of interest in the stored video stream is a major requirement of surveillance systems. Typically, the host retrieves the entire stored video stream from the data storage device and performs its own search to find the object of interest.

DETAILED DESCRIPTION

Overview

Figure 1A:
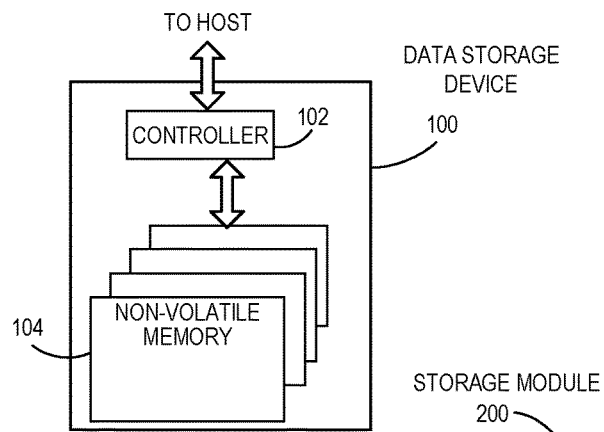
FIG. 1A is a block diagram of a data storage device of an embodiment.

By way of introduction, the below embodiments relate to a data storage device and method for real-time data locking in surveillance storage. In one embodiment, a data storage device is provided comprising a memory and a controller. The controller is configured to receive an image of an object of interest from a host; receive a video stream from the host; and as the video stream is being received from the host, determine whether the object of interest is present in the video stream.

In some embodiments, the controller is further configured to determine whether the object of interest is present in the video stream in real time as the video stream is being received from the host.

In some embodiments, the controller is further configured to determine whether the object of interest is present in the video stream by: decoding the video stream as it is received from the host; extracting intra-coded picture frames (I-frames) from the decoded video stream; and determining a match percentage of the extracted I-frames and the image of the object of interest.

In some embodiments, the controller is further configured to determine that the object of interest is present in the video stream in response to the match percentage exceeding a threshold.

In some embodiments, the controller is further configured to determine the match percentage at a frequency associated with a quality of service requirement.

In some embodiments, the controller is further configured to store the match percentage in a table.

In some embodiments, the controller is further configured to: in response to determining that the object of interest is present in the video stream, provide the host with an identifier of a video frame in the video stream that contains the object of interest.

In some embodiments, the identifier of the video frame comprises a logical block address of a location in the memory that stores the video frame.

In some embodiments, the identifier of the video frame comprises a time tag.

In some embodiments, the controller is further configured to provide the host with a match percentage of the video frame and the image of the object of interest.

In some embodiments, the controller is further configured to use machine learning to determine whether the object of interest is present in the video stream.

In some embodiments, the memory comprises a three-dimensional memory.

In another embodiment, a method is provided that is performed in a host in communication with a data storage device comprising a memory. The method comprises sending an image of an object of interest to the data storage device; sending a video stream to the data storage device; and instructing the data storage device to find the object of interest in the video stream.

In some embodiments, the method further comprises receiving, from the data storage device, an indication that the object of interest was found in the video stream.

In some embodiments, the method further comprises in response to receiving the indication, instructing a video capture device to improve resolution.

In some embodiments, the method further comprises in response to receiving the indication, sending a request to the data storage device for a video frame in the video stream that contains the object of interest.

In some embodiments, the indication comprises one or more of the following: an identifier of a video frame of the video stream that contains the object of interest, a logical block address of a location in the memory that stores the video frame, a time tag, and a match percentage of the video frame and the image of the object of interest.

In some embodiments, the method further comprises sending a plurality of images of objects of interest to the data storage device.

In some embodiments, the method further comprises prioritizing the plurality of images sent to the data storage device.

In another embodiment, a data storage device is provided comprising a memory and means for determining, in real time as a video stream is being received from a host, whether a reference image previously received from the host is present in the video stream.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
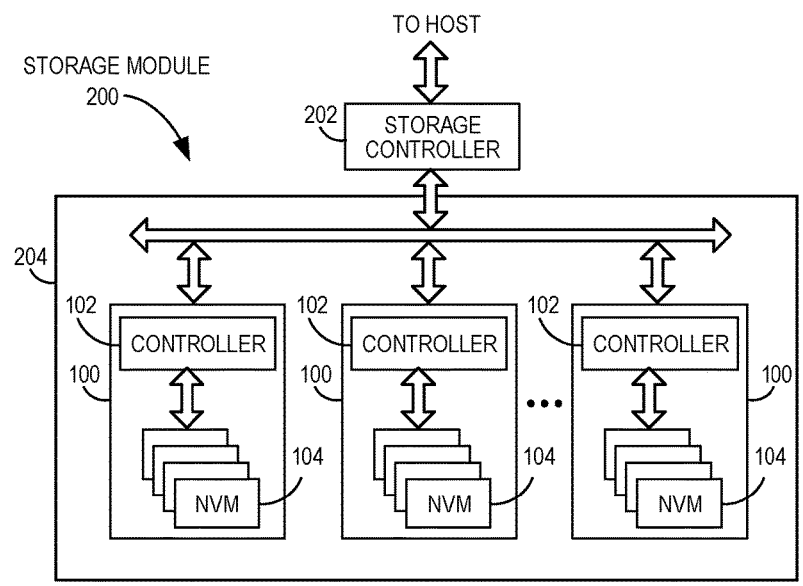
FIG. 1B is a block diagram illustrating a storage module of an embodiment.
Figure 1C:
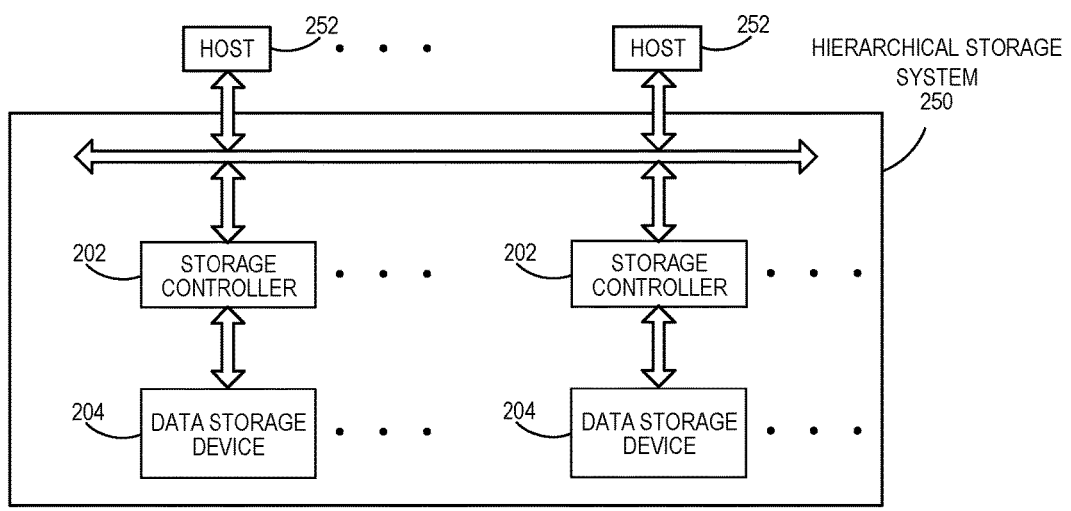
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
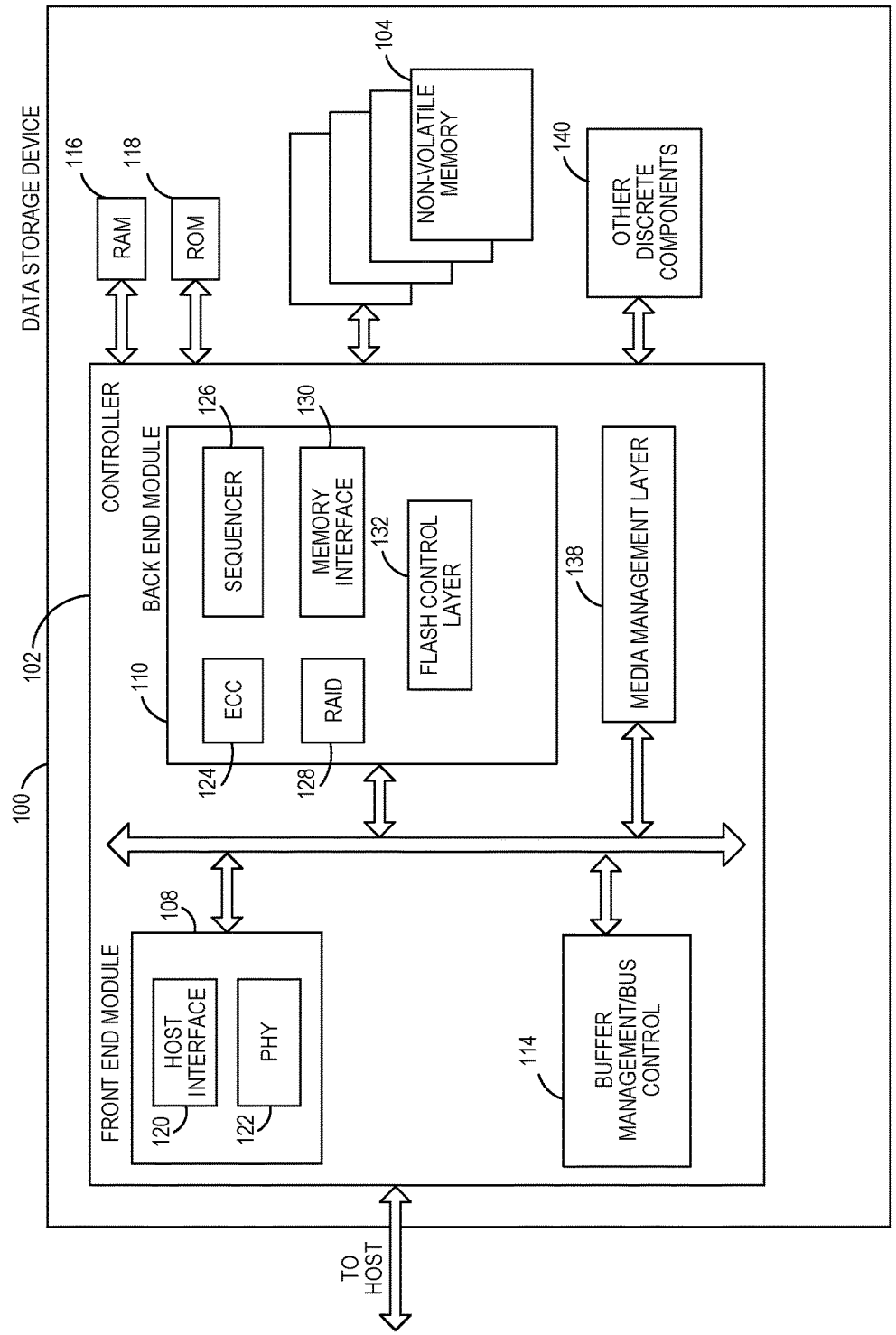
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
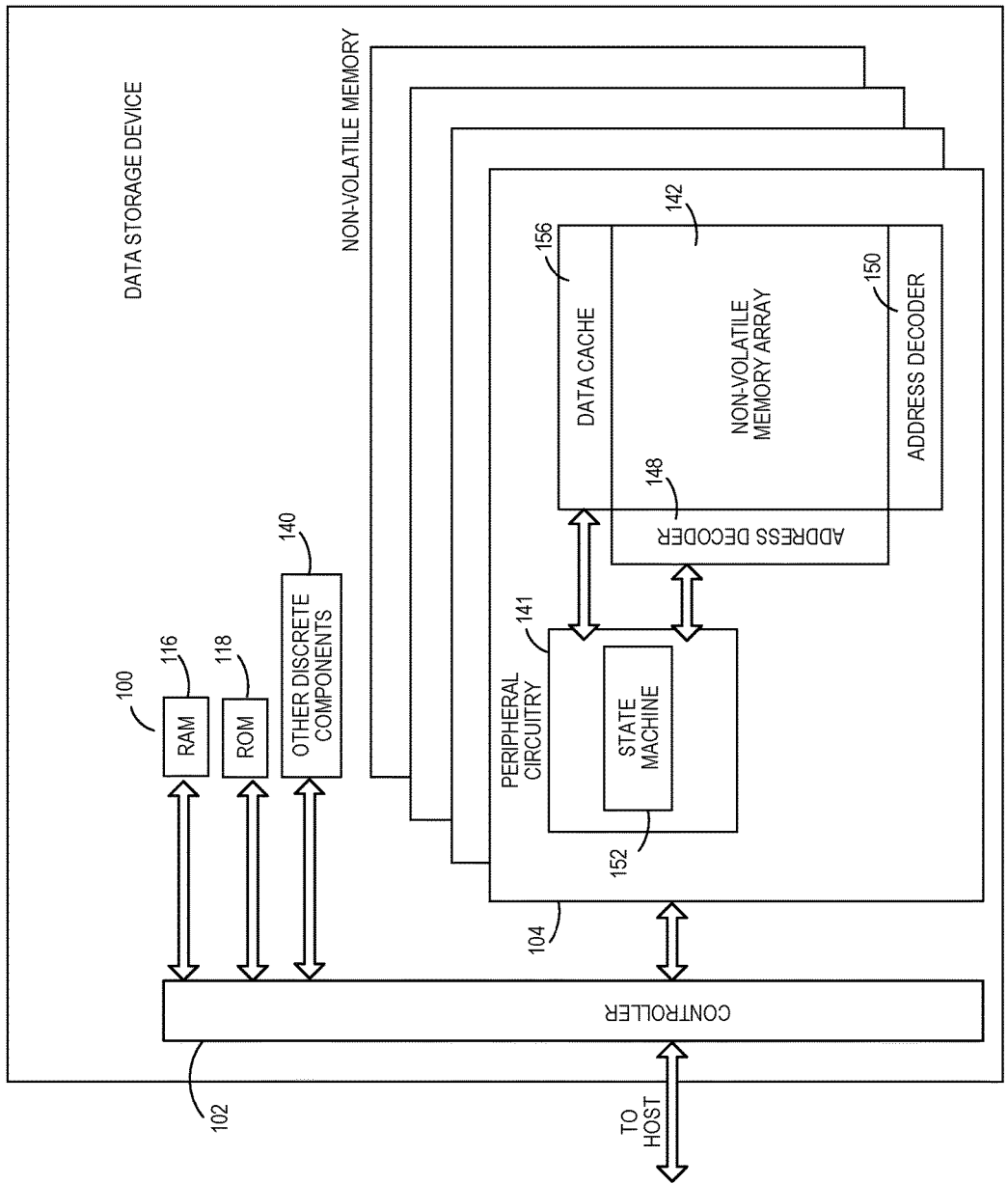
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
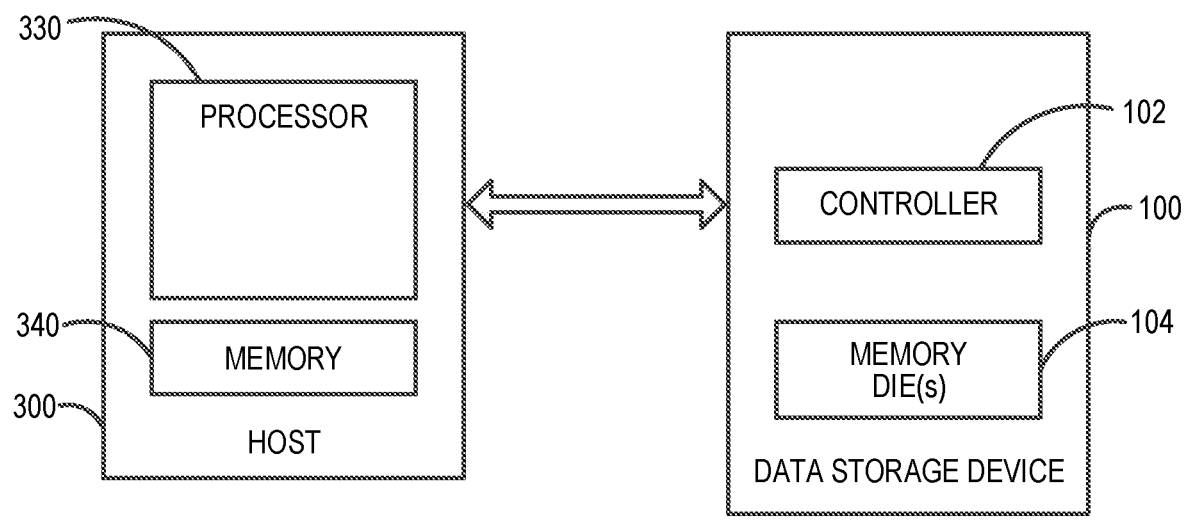
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, a data storage device can be used to store a video stream sent to it by a host. In a surveillance environment, the video stream can be stored in the data storage device's memory in the Moving Picture Experts Group Transport Stream (MPEG-TS) format (although other formats can be used). In general, with video compression, different video frames are compressed using different compression algorithms. Different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (JPEG) image file. In contrast, a predicted picture frame (P-frame) (or delta frame) contains the changes in the image from the previous frame and requires reference to other video frames to be decompressed. However, P-frames are more compressible than I-frames. A bidirectional predicted picture frame (B-frame) contains differences between the current frame and both the preceding and following frames. Accordingly, B-frames provide the highest amount of data compression.

Further, an Instantaneous Decoder Refresh (IDR) frame is a group of I-frame slices. With an IDR frame, all pictures in a reference buffer are marked as use for reference, and all subsequently-transmitted slices are decoded without reference to any frame decoded prior to the DR frame. No frame after the DR frame can reference any frame before it. DR frames are used to avoid any distortions in the video when fast-forwarding. DR frames are particularly useful for comparison to the reference image from the host because DR frames are independently-decodable frames on par with an image. In short, a search algorithm only has to figure out if the object in the reference image is the same as or related to the object in another image and, if so, the extent of the similarity.

Searching for an object of interest in the stored video stream is a major requirement of surveillance systems. As used herein, the term "object" will be used to refer to the person or thing that the host is searching for in the video. Typically, the host retrieves the entire stored video stream from the data storage device and performs its own search to find the object of interest. That is, the host retrieves the video stream offline if it determines to analyze the video stream for an object of interest. The decision, which is predominantly host driven, consumes a good portion of host bandwidth and can result in unnecessary data transfers.

The following embodiments, which are sometimes referred to herein as real-time data locking mechanisms, recognize that a data storage device that manages data for retrospective analysis may not be as desirable as an event-driven data storage device that can provide data and enable decisions in real time. Decisions in real time are best possible when the data storage device is aware of what to analyze and when to analyze prior to long-term storage in the memory of the data storage device.

Figure 4:
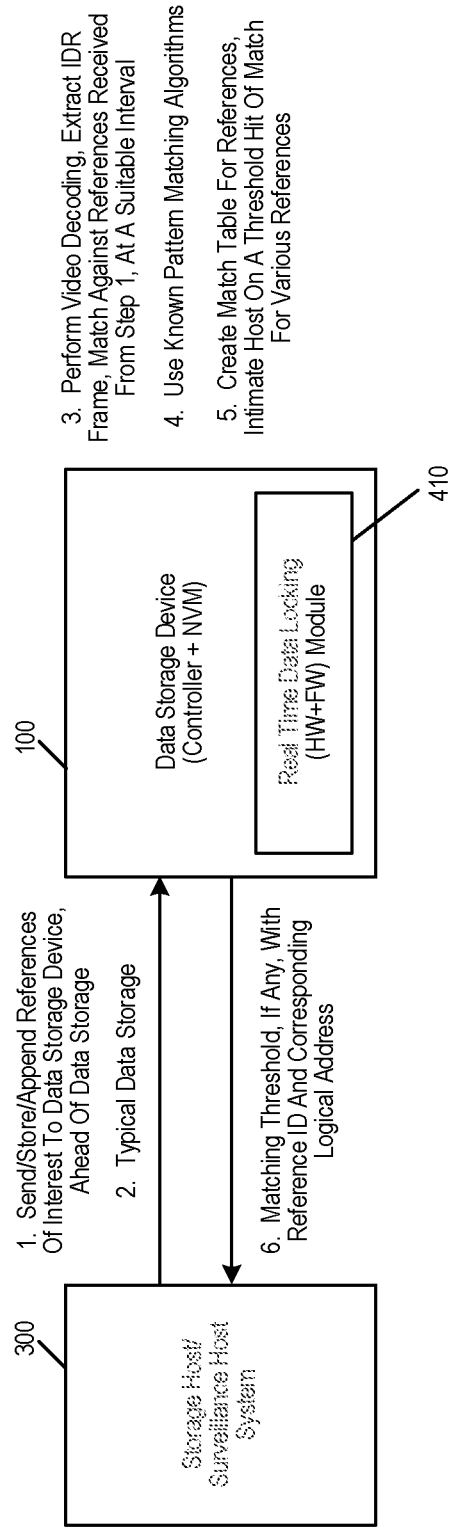
FIG. 4 is a block diagram of a host and a real-time data locking data storage device of an embodiment.

FIG. 4 is a block diagram that will be used to illustrate one example implementation of an embodiment where the searching for an object of interest in a video stream is offloaded from the host 300 to the data storage device 100 and is done as the data storage device 100 is receiving the video stream from the host 300. It should be noted that FIG. 4 shows one example implementation, and other implementations can be used. Also, while certain details are provided in this example for illustrative purposes, those details should not be read into the claims unless expressly recited therein.

As shown in FIG. 4, in this embodiment, the host 300 sends an image of an object of interest to the data storage device 100 prior to sending a video stream to the data storage device 100 (acts 1 and 2). The data storage device 100 uses that image as a reference image for the search and can store the reference image in volatile or non-volatile memory in the data storage device 100. It should be noted that while this example will be explained in terms of one object of interest, the host 300 can provide the data storage device 100 with a plurality of images of objects of interest, which can be prioritized by the host 300.

When the data storage device 100 receives a video stream from the host 300 for storage in its memory 104, the controller 102 (e.g., a real-time data locking module 410 in the controller 102) determines, as the video stream is being received from the host 300, whether the object of interest is present in the video stream. This can be done in real time or with some delay. Also, in some cases, the match is done partially in real time, the match recorded in the memory 104, and the rest of the match with deeper conviction in done non-real time. Either way, the determination is made prior to the entire video stream being stored in the memory 104. For example, as the data storage device 100 is receiving the video stream from the host 300, the controller 102 can decoded the video stream and extract intra-coded picture frames (I-frames) from the decoded video stream (act 3). The controller 102 can then determine a match percentage of the extracted I-frames and the image of the object of interest (act 4). The pattern matching process can be done in any suitable way. In one embodiment, the controller 102 uses artificial intelligence or machine learning to match the host-provided image to the objects in different video frames. Examples of image recognition techniques that can be used to perform the search include, for instance, those in U.S. Pat. No. 7,847,820 and U.S. Patent Application Publication No. US2006/0190419, which are hereby incorporated by reference.

Using this embodiment, the controller 102 can determine that the object of interest is present in one or more video frames in the video stream. The controller 102 can keep a record of the matching video frames in any suitable way. For example, in one embodiment, the controller 102 can create and maintain a table that details the match percentage, as well as other information, such as, but not limited to, an identifier of a video frame of the video stream that contains the object of interest, a logical block address of a location in the memory 104 that stores the video frame, and a time tag (act 5). This process is performed on some, if not all, of the video frames in the video stream.

Also, the determination of match percentage can be done at a predetermined or variable frequency (e.g., at a frequency associated with a quality of service requirement). For example, assuming a group of pictures (GOP) of one second and one I-frame in one GOP, the data storage device 100 has one second to perform all data matching (with available references) to the I-frame in real time. Hence, if the controller 102 determines that it cannot finish all the matching within that time, it may consider a lower frequency, such as performing the match every two seconds (e.g., skipping alternate I-frames). This would be one example of quality-of-service versus real-time design considerations in the surveillance storage.

If the match percentage exceeding a threshold, the controller 102 can determine that the object of interest is in a given video frame in the video stream and can provide an indication of the match to the host 300 (act 6). For example, one or more of the items stored in the matching table can be sent to the host 300 upon a match to indicate that the data storage device 100 found the object of interest in the video stream.

The host 300 can take action based on an indication of a match from the data storage device 100. For example, upon receiving the indication, the host 300 can instruct a video capture device connected to the host 300 to improve resolution or can request the video frame(s) containing the object of interest and perhaps even the surrounding video frame(s). Of course, these are merely examples, and other host actions can take place.

Figure 5:
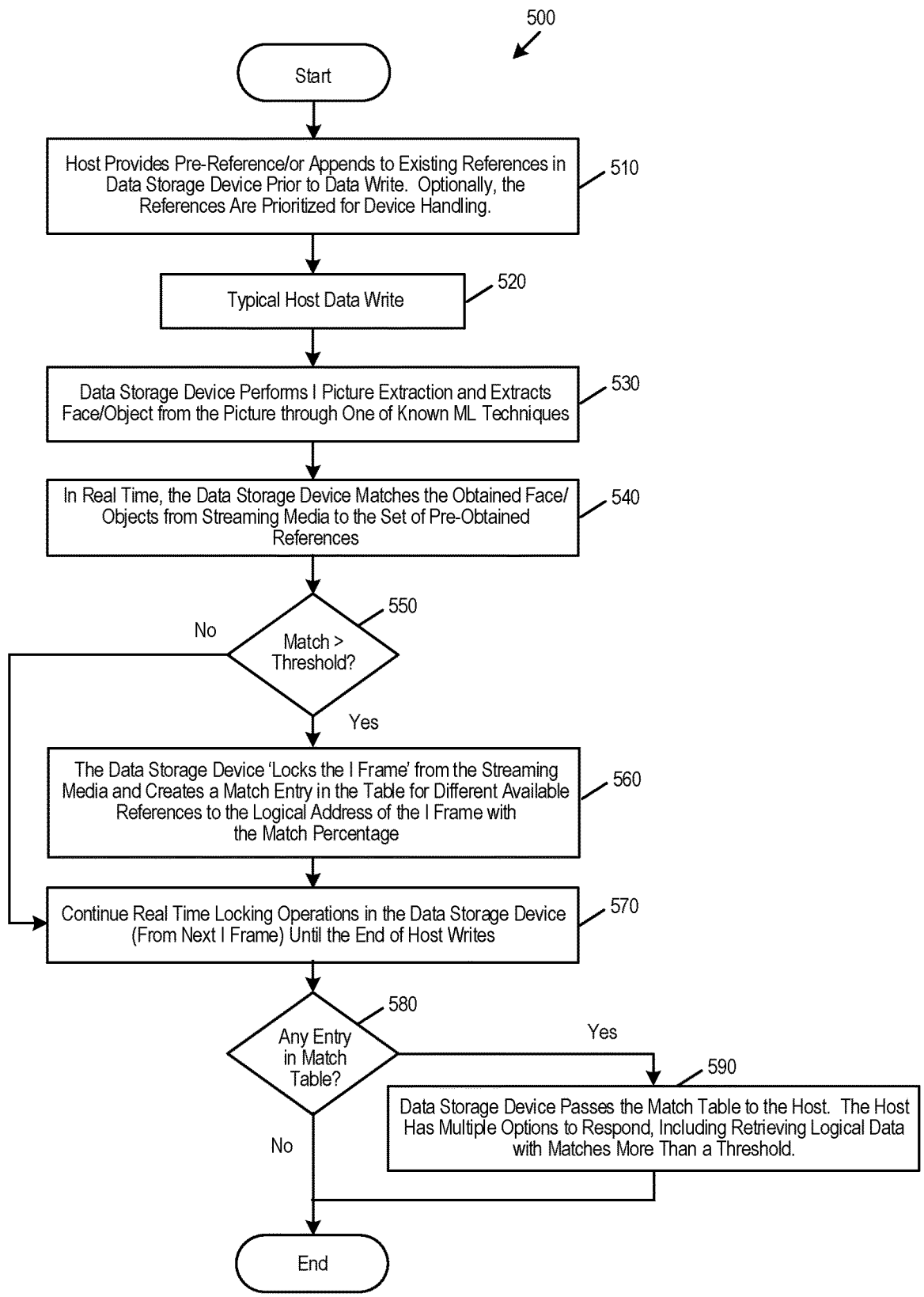
FIG. 5 is a flow chart of a method of an embodiment for real-time data locking.

Turning again to the drawings, FIG. 5 is a flow chart 500 of a method of an embodiment for real-time data locking. As shown in FIG. 5, the host 300 provides a "pre-reference" (e.g., an image of an object of interest) or appends an image to an existing reference image in the data storage device 100 prior to writing a video stream to the data storage device 100 (act 510). In some cases, the host 300 may append a set of new references on top of existing references to the data storage device 100. If the host 300 is providing multiple images of objects of interest, the host 300 can prioritize those objects. Also, the data stream provided by the host 300 can be captured by one or more video capture devices (cameras) connected to the host 300.

Next, the host 300 writes the video stream to the data storage device 100 (act 520). The data storage device 100 then determines if the object of interest is in the video stream. For example, in this embodiment, the controller 102 in the data storage device 100 performs I-frame extraction and extracts the object of interest (e.g., a face) from the I-frame picture using, for example, a known machine-learning technique (act 530). In real time (or near real time), the data storage device 100 matches the obtained object of interest from the streaming media to the set of pre-obtained reference images (act 540) and determines if there is a match (act 550)

If there is a match, the controller 102 in the data storage device 100 "locks the I-frame" from the streaming media and creates a match entry in a table (act 560). This can include, for example, associating the logical block address of the I-frame with the match percentage. Then (or if there is not a match), the controller 102 continues real-time locking operations from the next I-frame until the end of the host write (act 570).

If there is an entry in the matching table (act 580), the data storage device 100 passes the match table (or a set of entries from the table) to the host 300 (act 590). The host 300 can take any suitable action in response to receiving the match table. For example, the host 300 can retrieve logical data that has a match percentage greater than a threshold.

In summary, with these embodiments, the host 300 can send a reference image of an object of interest upfront to the data storage device 100, and the data storage device 100 can proactively look out for object matches in a forthcoming data stream meant for storage. The data storage device 100 can perform object matching, for example, by video decoding of an incoming video stream, extracting I-frames, and matching the I-frames to the reference image (at a threshold frequency) using any suitable pattern-matching algorithm (e.g., now known or later developed, either open source or proprietary). On hitting a pattern match above a threshold for reference image(s) in the video stream, the data storage device 100 can provide an indication of the match (e.g., using a reference ID, the match percentage, logical block address, or time tag) to the host 300. The host 300 may act upon this hint by instructing the capturing device/camera for superior resolution for a period of time. Subsequent high quality capture enables pattern matching with deeper conviction. The sequence of actions can be changed based on the matching threshold.

There are several advantages associated with these embodiments. For example, these embodiments can be used to assist law enforcement agencies to track objects of interest (e.g., people or vehicles) proactively in real time. This provides a more robust system than those that use reverse streaming for retrospective analysis, as these embodiments can provide real time responses, faster results, and optimum data transfers.

Many different alternatives can be used with these embodiments. For example, in one alternate embodiment, the host 300 performs real-time data locking prior to sending data to the data storage device 100. In this alternate embodiment, the host 300 may need to cache the references stored in the data storage device 100 for every match, if there are several references.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller configured to:
     receive an image of an object of interest from a host;
     receive a video stream from the host;
     as the video stream is being received from the host and prior to the video stream being stored in the memory, determine whether the object of interest is present in the video stream; and
     in response to determining that the object of interest is present in the video stream:
       inform the host that the object of interest is present in the video stream; and
       receive, from the host, additional portions of the video stream captured with a higher resolution after the object of interest was determined to be present in the video stream.

2. The data storage device of claim 1, wherein the controller is further configured to determine whether the object of interest is present in the video stream in real time as the video stream is being received from the host.

3. The data storage device of claim 1, wherein the controller is further configured to determine whether the object of interest is present in the video stream by:
   decoding the video stream as it is received from the host;
   extracting intra-coded picture frames (I-frames) from the decoded video stream; and
   determining a match percentage of the extracted I-frames and the image of the object of interest.

4. The data storage device of claim 3, wherein the controller is further configured to determine that the object of interest is present in the video stream in response to the match percentage exceeding a threshold.

5. The data storage device of claim 3, wherein the controller is further configured to determine the match percentage at a frequency associated with a quality of service requirement.

6. The data storage device of claim 3, wherein the controller is further configured to store the match percentage in a data structure.

7. The data storage device of claim 1, wherein the controller is further configured to:
   in response to determining that the object of interest is present in the video stream, provide the host with an identifier of a video frame in the video stream that contains the object of interest.

8. The data storage device of claim 7, wherein the identifier of the video frame comprises a logical block address of a location in the memory that stores the video frame.

9. The data storage device of claim 7, wherein the identifier of the video frame comprises a time tag.

10. The data storage device of claim 7, wherein the controller is further configured to provide the host with a match percentage of the video frame and the image of the object of interest.

11. The data storage device of claim 1, wherein the controller is farther configured to use machine learning to determine whether the object of interest is present in the video stream.

12. The data storage device of claim 1, wherein the memory comprises a three-dimensional memory.

13. A method comprising:
performing the following in a host in communication with a data storage device comprising a memory:
sending an image of an object of interest to the data storage device;
sending a video stream to the data storage device;
instructing the data storage device to find the object of interest in the video stream;
receiving, from the data storage device, an indication that the object of interest was found in the video stream; and
sending additional portions of the video stream captured with a hi her resolution after the indication was received.

14. The method of claim 13, further comprising:
in response to receiving the indication, instructing a video capture device to improve resolution.

15. The method of claim 13, further comprising:
in response to receiving the indication, sending a request to the data storage device for a video frame in the video stream that contains the object of interest.

16. The method of claim 13, wherein the indication comprises one or more of the following: a logical block address of a location in the memory that stores the video frame, a time tag, and a match percentage of the video frame and the image of the object of interest.

17. The method of claim 13, further comprising sending a plurality of images of objects of interest to the data storage device.

18. The method of claim 17, further comprising prioritizing the plurality of images sent to the data storage device.

19. A data storage device comprising:
a memory;
means for receiving an image of an object of interest from a host;
means for receiving a video stream from the host;
means for determining, as the video stream is being received from the host and prior to the video stream being stored in the memory, whether the object of interest is present in the video stream;
means for informing the host that the object of interest is present in the video stream in response to determining that the object of interest is present in the video stream; and
means for receiving, from the host, additional portions of the video stream captured with a higher resolution after the object of interest was determined to be present in the video stream.

20. The method of claim 13, wherein the indication comprises an identifier of a video frame of the video stream that contains the object of interest.

* * * * *